US010513180B2

(12) United States Patent
Quill

(10) Patent No.: US 10,513,180 B2
(45) Date of Patent: Dec. 24, 2019

(54) STAND-ALONE KINETIC ENERGY CONVERTER SYSTEM

(71) Applicant: Emerald Technology Partners, LLC, Dunedin, FL (US)

(72) Inventor: Michael A. Quill, Dunedin, FL (US)

(*) Notice: Subject to any disclaimer, the term of this patent is extended or adjusted under 35 U.S.C. 154(b) by 0 days.

(21) Appl. No.: 16/429,200

(22) Filed: Jun. 3, 2019

(65) Prior Publication Data

US 2019/0329650 A1  Oct. 31, 2019

Related U.S. Application Data

(63) Continuation-in-part of application No. 15/599,644, filed on May 19, 2017, which is a continuation of application No. 13/581,803, filed as application No. PCT/US2011/054474 on Oct. 1, 2011, now Pat. No. 9,707,844.

(60) Provisional application No. 61/526,763, filed on Aug. 24, 2011, provisional application No. 61/484,805, filed on May 11, 2011, provisional application No. 61/389,093, filed on Oct. 1, 2010.

(51) Int. Cl.
  *B60K 25/08* (2006.01)
  *B60H 1/00* (2006.01)

(52) U.S. Cl.
  CPC ........... *B60K 25/08* (2013.01); *B60H 1/0045* (2013.01); *B60W 2300/126* (2013.01); *Y02T 10/90* (2013.01)

(58) Field of Classification Search
  CPC ................. B60K 25/08; B60H 1/0045; B60W 2300/126; Y02T 10/90; H02J 7/1415; H02J 7/1423
  USPC .......................................................... 307/9.1
  See application file for complete search history.

(56) References Cited

U.S. PATENT DOCUMENTS 5,921,334 A * 7/1999 Al-Dokhi ................. B60L 8/00
                                                        180/2.2

* cited by examiner

*Primary Examiner* — Carlos Amaya
(74) *Attorney, Agent, or Firm* — Tiffany C. Miller; Inventions International Inc.

(57) ABSTRACT

A refrigeration system can include an electrical generator coupled to a mechanical interface, the mechanical interface configured to transfer mechanical energy from a vehicle to the electrical generator, and a control module connected to the electrical generator via electrical wiring. The refrigeration system can also include an electrically-driven refrigeration unit coupled to the control module, and a battery coupled to the control module via electrical wiring. The control module can be adapted to provide electrical power to the refrigeration unit from the electrical generator or the battery and is further adapted to charge the battery with electrical energy not needed for operating the refrigeration unit.

9 Claims, 19 Drawing Sheets

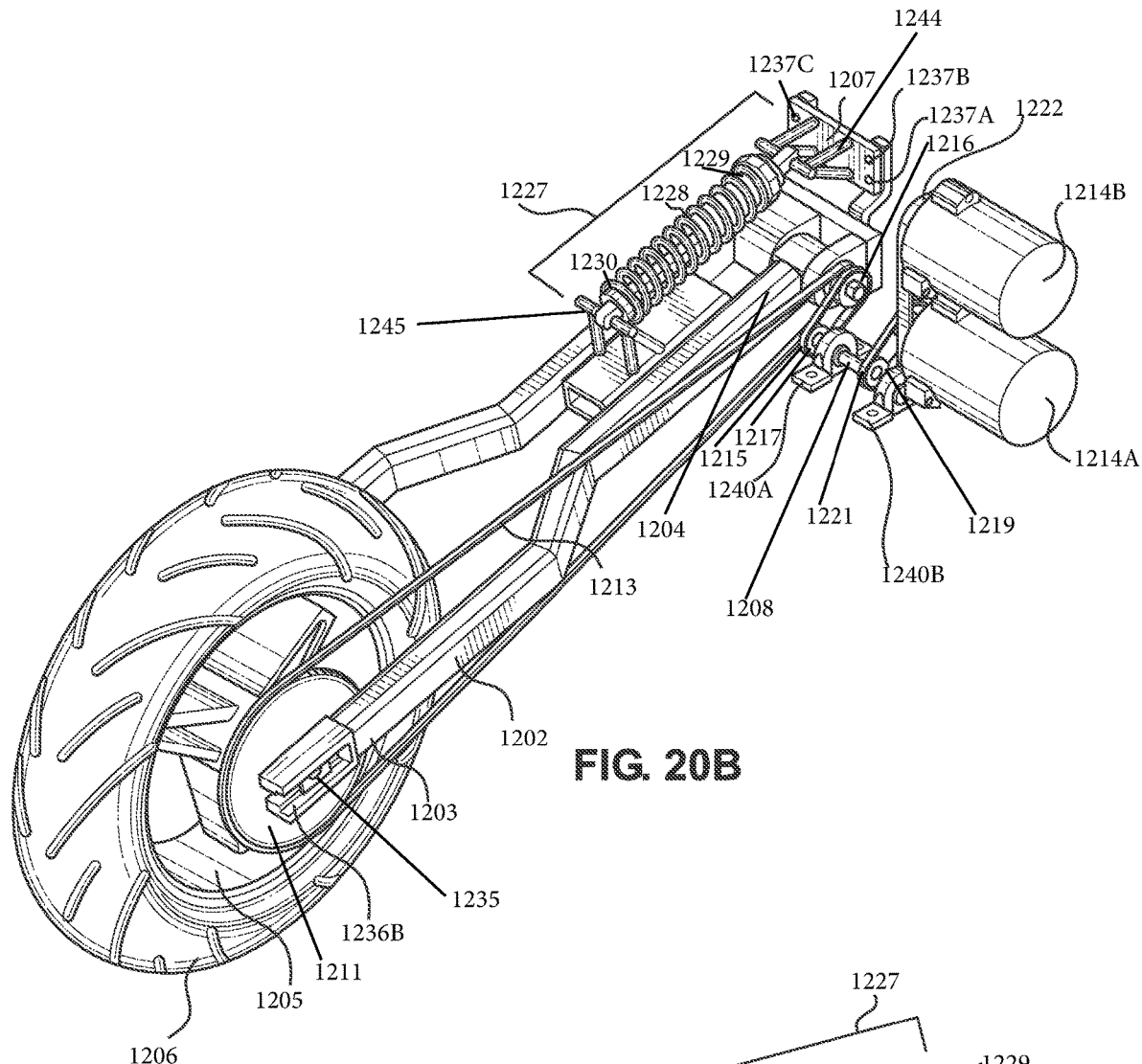
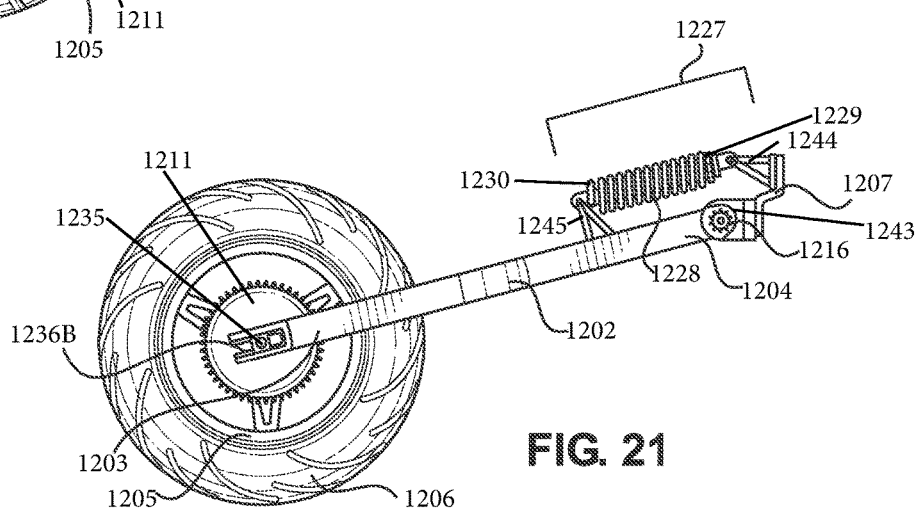

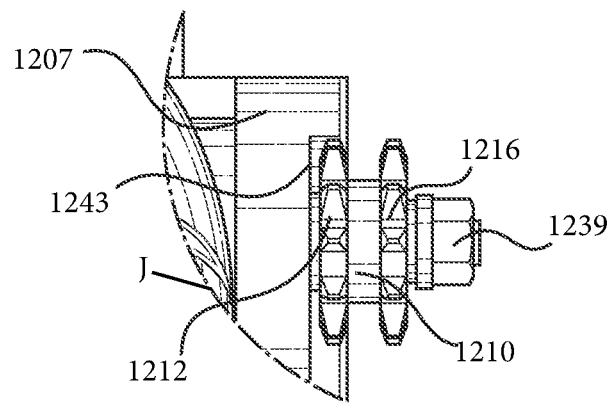
FIG. 23B
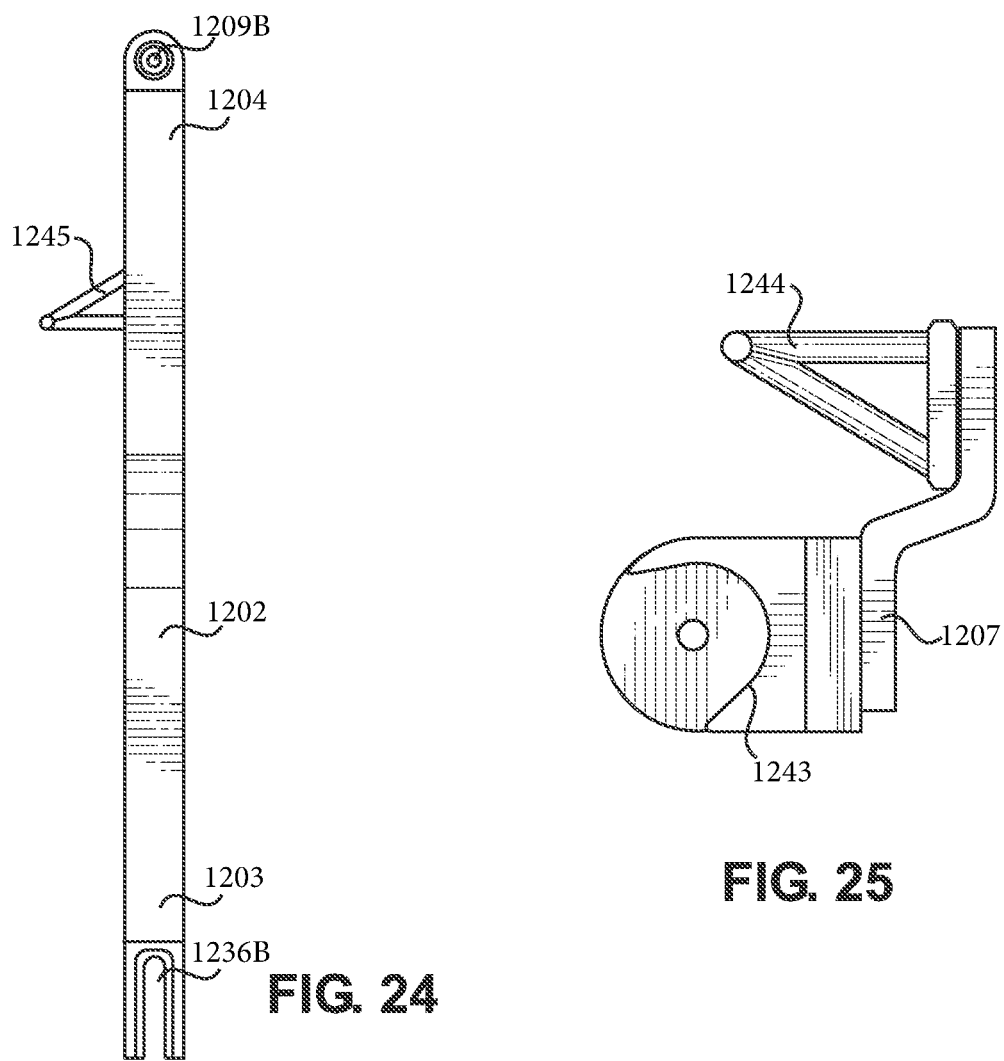
FIG. 24
FIG. 25

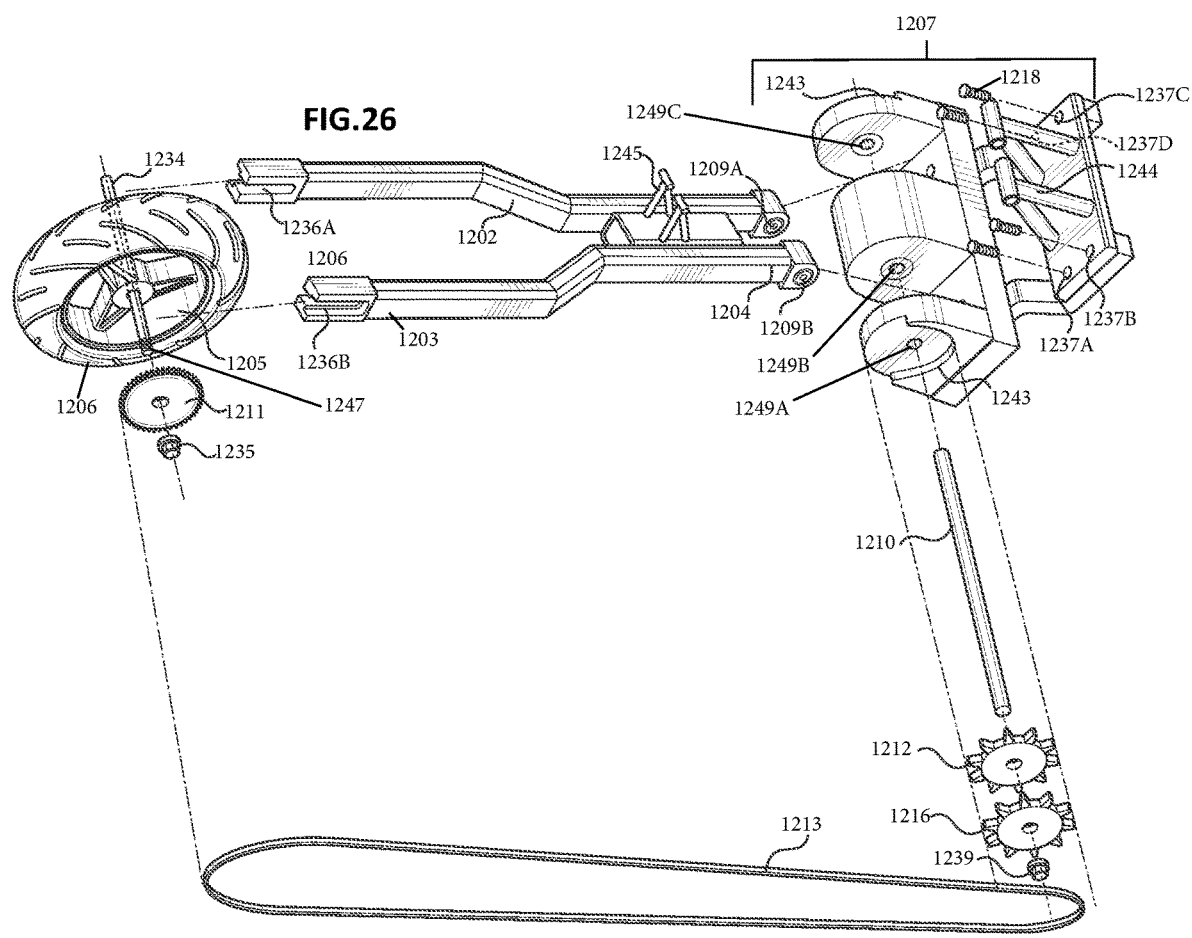

STAND-ALONE KINETIC ENERGY CONVERTER SYSTEM

CROSS REFERENCE TO RELATED APPLICATIONS

This application is a continuation-in-part of co-pending U.S. patent application Ser. No. 15/599,644 filed May 19, 2017, entitled, "KINETIC ENERGY CONVERTER SYSTEM" which is a continuation of U.S. patent application Ser. No. 13/581,803 filed Aug. 30, 2012, entitled, "SEMI-TRAILER KINETIC ENERGY CAPTURE SYSTEM" which is a National Stage Entry of PCT/US11/54474, filed Oct. 1, 2011, entitled, "REFRIGERATION SYSTEM" which claims priority to U.S. Provisional Patent Application No. 61/526,763, filed Aug. 24, 2011, entitled, "Refrigeration System" which claims priority to U.S. Provisional Patent Application No. 61/484,805, filed May 11, 2011, entitled, "KINETIC ENERGY CONVERTER SYSTEM" which claims priority to U.S. Provisional Patent Application No. 61/389,093, filed Oct. 1, 2010, entitled, "Generator for Truck Refrigeration Unit".

BACKGROUND OF THE INVENTION

1. Field of the Invention

The embodiments relate generally to a refrigeration system. More particularly, to a refrigeration system that is powered by electrical energy generated by mechanical motion from a vehicle. The electrical energy can be used when generated or stored, for example in a battery, for use at a later time.

2. Background Art

Refrigerated vehicles or cargo conveyances, such as semi-trailers, train/railroad cars, cargo containers, barges, cargo ships, aircraft and the like, typically rely on power from a combustion engine (e.g., diesel, gasoline, etc.) to operate a refrigeration unit in order to maintain a desired temperature within the refrigerated cargo area. However, combustion engines may suffer from certain limitations or problems in that they consume fuel, generate exhaust gases and may produce noise when operating. The present invention was conceived in light of the above-mentioned problems or limitations of conventional combustion engine-powered refrigeration units, among other things.

SUMMARY OF THE INVENTION

An embodiment includes a system to generate electrical energy using mechanical energy from a vehicle to power a refrigeration unit using the generated electrical energy. For example, an electrical power generating system can include a generator that can be mounted on a vehicle, for example under a semi-trailer. The generator can be driven by wheel rotation of a wheel (or wheels) of the semi-trailer to supply electrical power to the refrigeration unit.

BRIEF DESCRIPTION OF THE DRAWINGS

FIG. 20B is a perspective view of a swing arm connected to a tire, a mounting structure, and alternators;

FIG. 21 is a side view of a swing arm connected to a tire and a mounting structure;

FIG. 23B is a partial view of FIG. 23A at J;

FIG. 24 is a side view of a swing arm;

FIG. 25 is a side view of a mounting structure; and,

FIG. 26 is an exploded view of a swing arm connected to a tire and a mounting structure.

DETAILED DESCRIPTION OF THE PREFERRED EMBODIMENT

Broadly, an embodiment of the present invention generally provides a system capable of capturing kinetic energy through a component (e.g., brake drum, wheel rim, axle or the like) of a semi-trailer and converting it to electric power in order to power an electrical device such as an electrically powered refrigeration unit.

Figure 1:
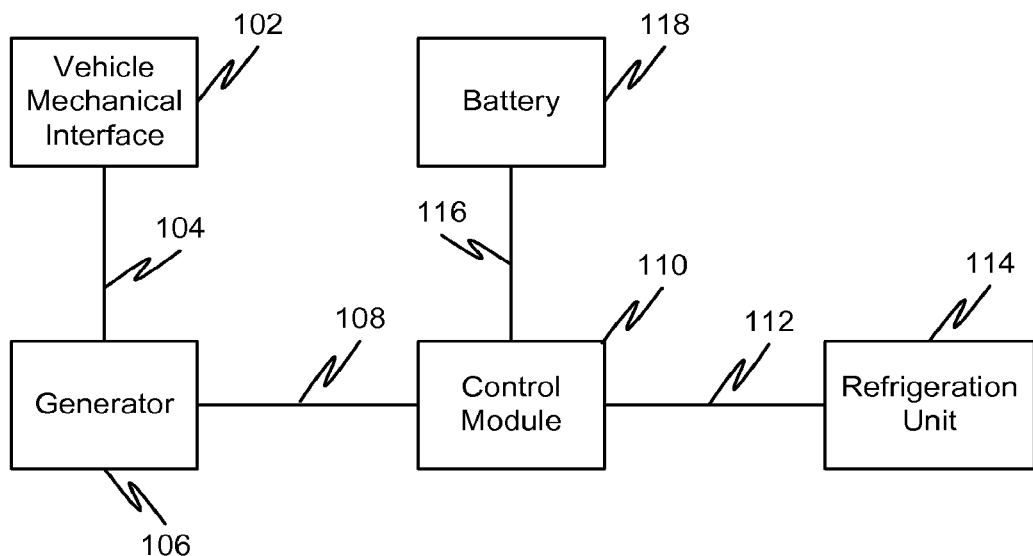
FIG. 1 is a block diagram of an exemplary embodiment of a refrigeration system in accordance with at least one embodiment.

FIG. 1 is a block diagram of an exemplary refrigeration system 100. The system 100 includes a vehicle mechanical interface 102 coupled to a generator 106 via a mechanical linkage 104. The generator 106 is connected to a control module 110 via electrical wiring 108. The control module 110 is connected to an electrically-powered refrigeration unit 114 via wiring 112. The control module 110 is also optionally connected to a battery 118 via wiring 116. The battery 118 can include one or more banks of batteries.

In operation, motion from a vehicle component, such as a wheel of a semi-trailer or railroad car, moves the vehicle mechanical interface 102, which in turn transfers motion to the generator 106 via the mechanical linkage 104 (e.g., axle). The vehicle mechanical interface 102 can include a gear system, pulley system or other suitable mechanical interface.

The control module 110 can also include an interface to provide electrical power to the truck cab for powering air conditioning, electronics and the like when the main engine of the truck is turned off. This can be advantageous in areas where regulations limit or prohibit the idling of truck engines. The electrical energy provided to the truck can come from the battery (or batteries) or from the generator when the truck is in motion.

Also, the system can include an electrical interface for charging the battery or running the refrigeration unit from an external power source such as a building electric supply or a gas or diesel stand-by generator. The electrical interface can include a retractable cord that is connected to the control module 110 on one end and has a standard plug on the other end for connecting to a building power supply outlet or a generator outlet.

Motion of the vehicle (e.g., semi-trailer or rail car) is used to drive the generator 106 and generate electrical energy, which is transferred to the control module 110 via electrical wiring 108. The control module 110 routes the electrical energy to the refrigeration unit 114, the battery 118, or both. The control module can monitor the need for power at the refrigeration unit 114 and supply electrical energy as needed. Also, the control module 110 can be configured to store any unneeded or unused electrical energy into an optional battery 118.

Figure 2:
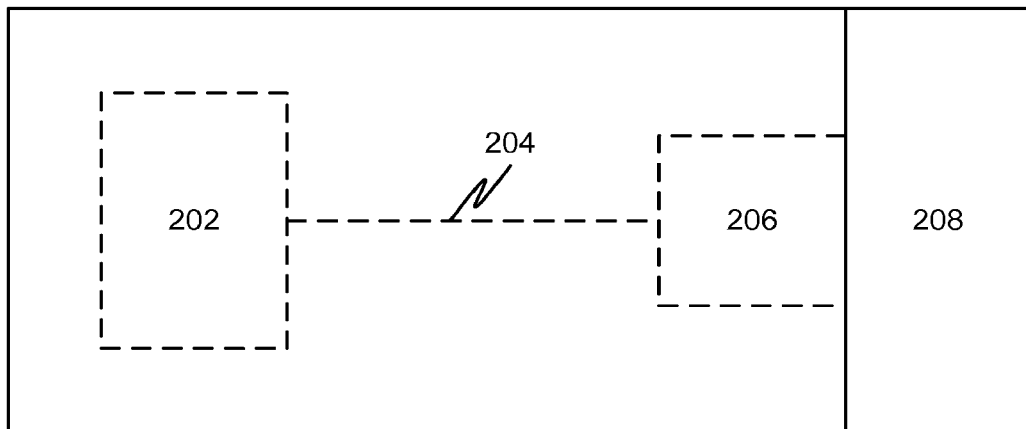
FIG. 2 is a block diagram of an exemplary embodiment of a refrigeration system for a refrigerated semi-trailer in accordance with at least one embodiment.

FIG. 2 is a block diagram of an exemplary embodiment of a refrigeration system for a refrigerated semi-trailer in accordance with the present disclosure. In particular, a refrigeration system 200 includes a generator portion 202, an electrical connection 204, a control module 206 and an electrically driven refrigeration unit 208.

Figure 3:
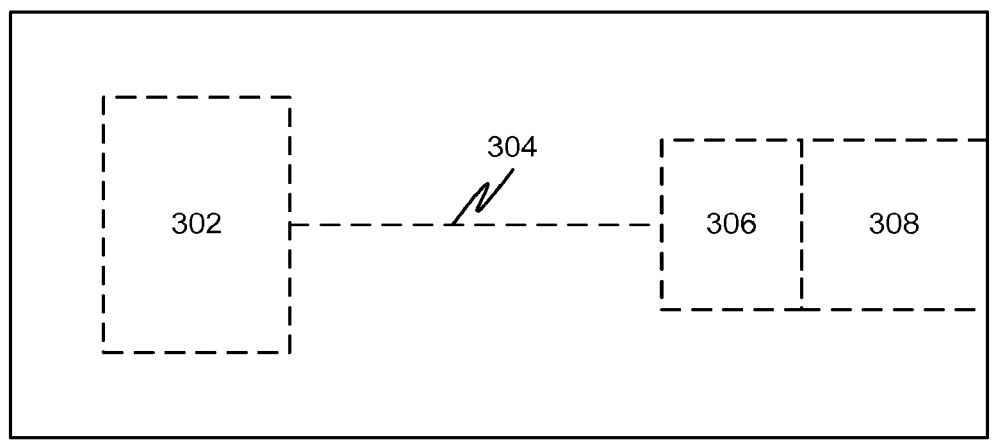
FIG. 3 is a block diagram of an exemplary embodiment of a refrigeration system for a refrigerated train car in accordance with at least one embodiment.

FIG. 3 is a block diagram of an exemplary embodiment of a refrigeration system for a refrigerated railroad car in accordance with the present disclosure. In particular, the system 300 includes a generator portion 302, electrical wiring 304, a control module 306 and an electrically-powered refrigeration unit 308.

Figure 4:
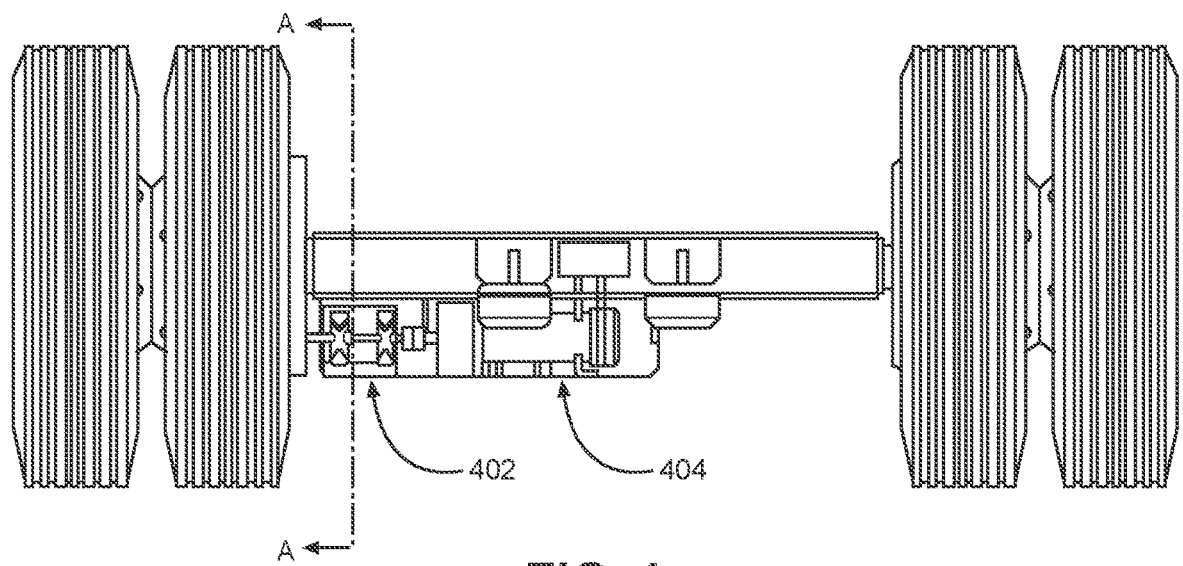
FIG. 4 is a top view of a refrigeration system generator in accordance with the present disclosure.
Figure 7:
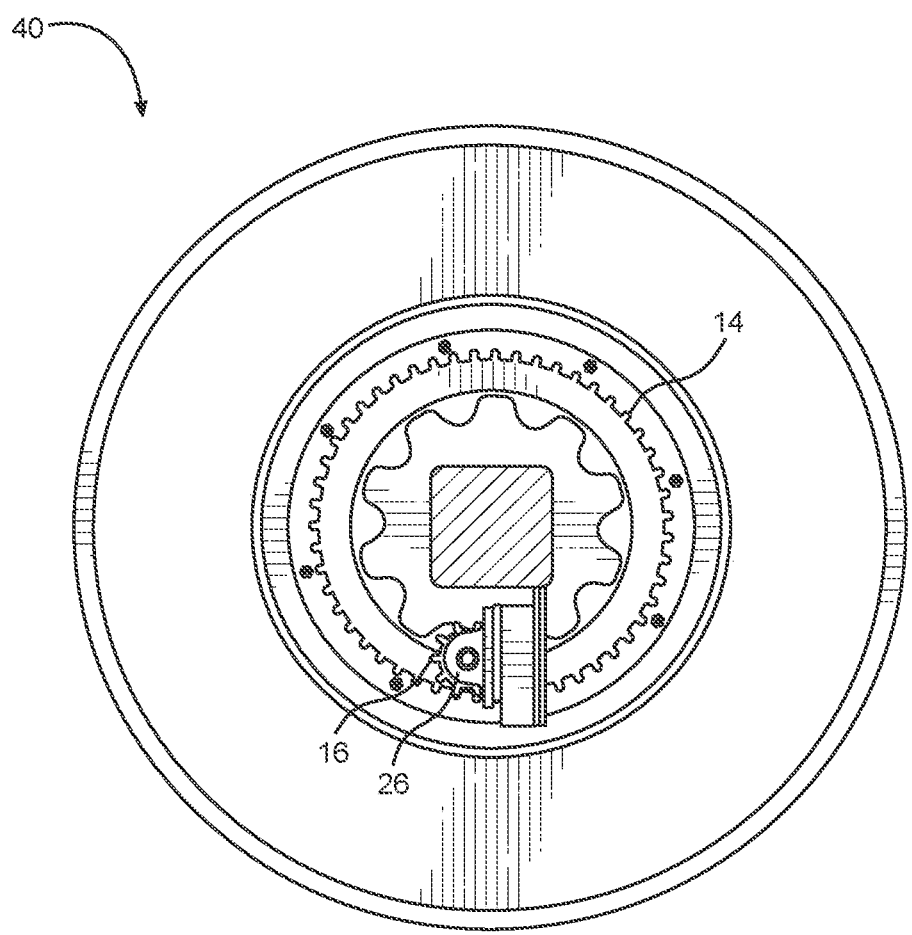
FIG. 7 is a cross-sectional view of FIG. 4 along A-A.

FIG. 4 is a top view of a refrigeration system generator showing a mechanical interface and linkage 402 and a generator 404. FIG. 7 is a cross-sectional view of FIG. 4.

Figure 5:
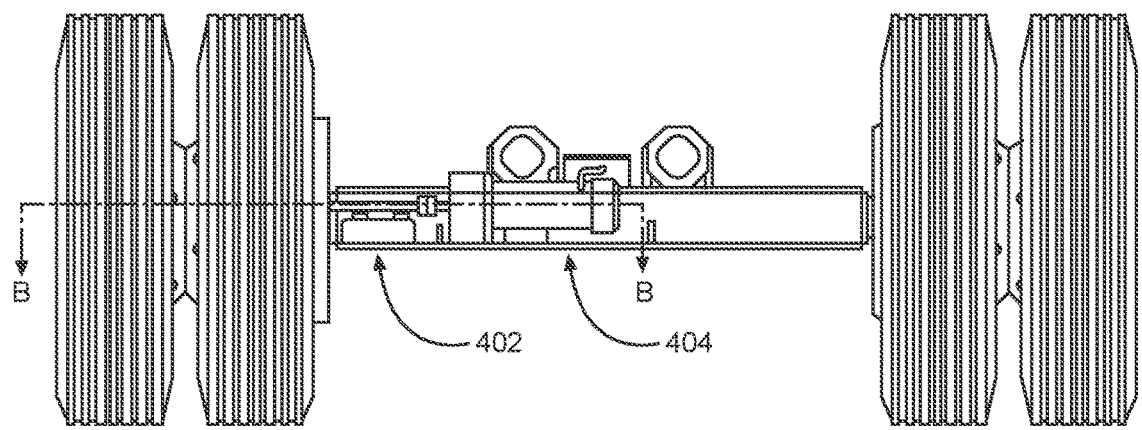
FIG. 5 is a rear view of a refrigeration system generator in accordance with at least one embodiment.
Figure 6:
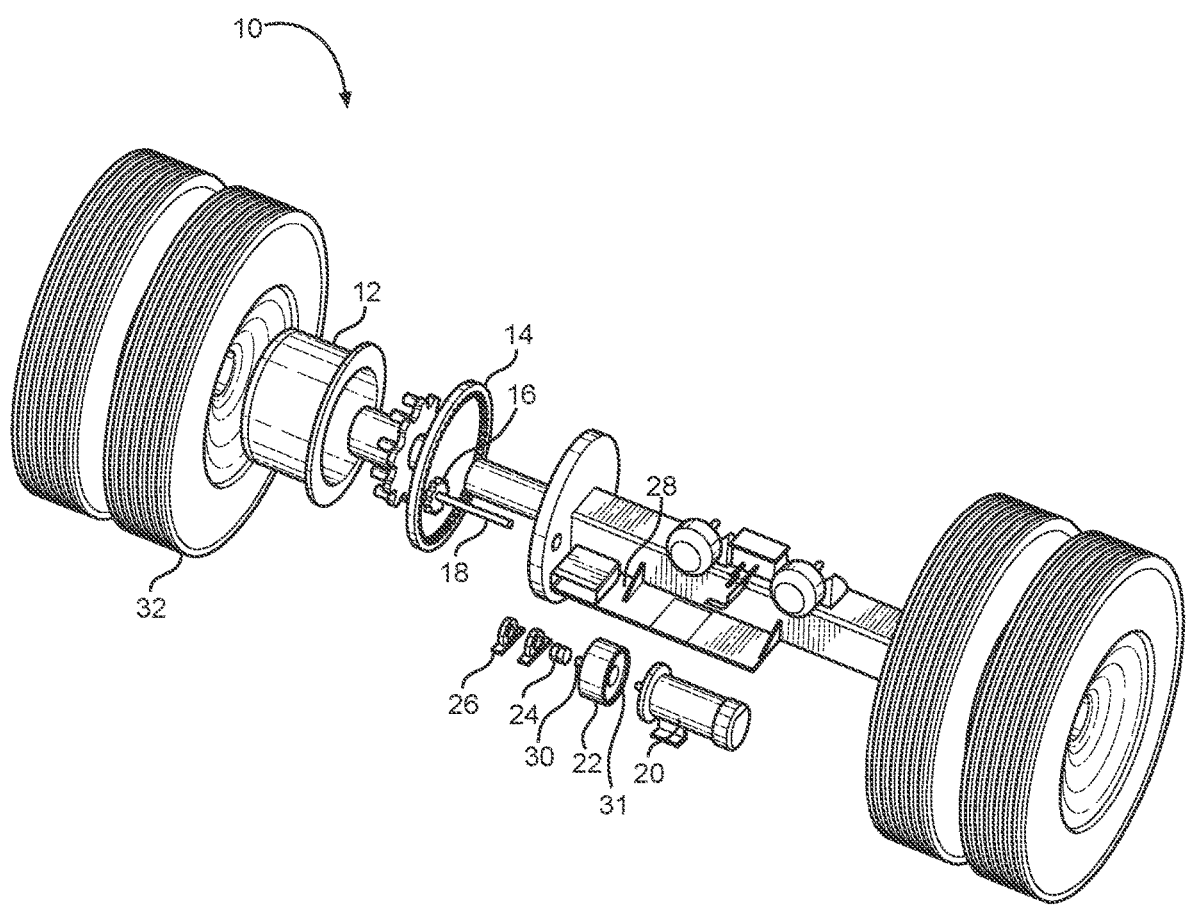
FIG. 6 is an exploded view of a refrigeration system generator in accordance with at least one embodiment.
Figure 8:
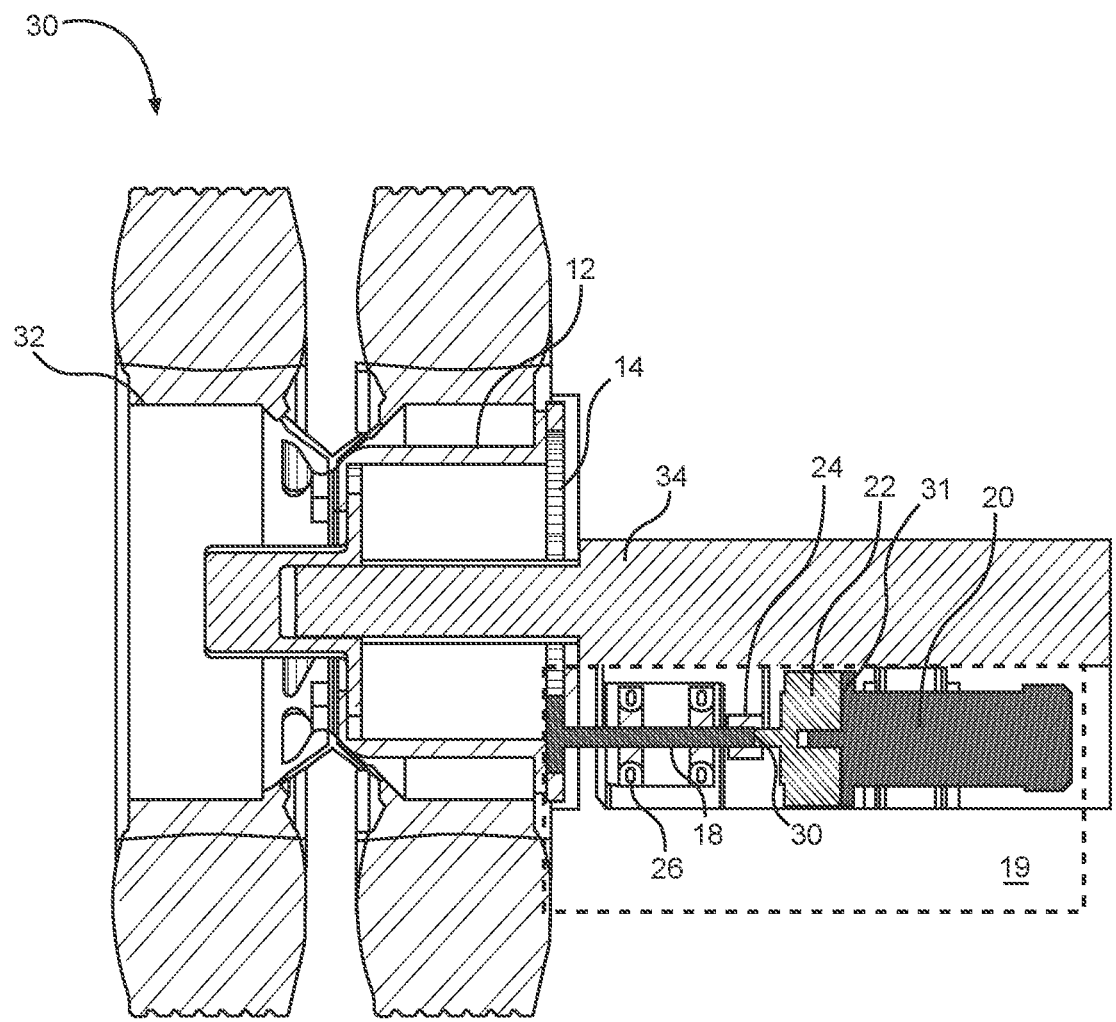
FIG. 8 is a cross-sectional view of FIG. 5 along B-B.

FIG. 5 is a rear view of a refrigeration system generator showing the mechanical interface and linkage 402, the generator 404 and an electrical junction box 502. FIG. 8 is a cross-sectional view of FIG. 5. FIG. 6 is an exploded view of a refrigeration system generator in accordance with the present disclosure.

Referring now to FIGS. 4-8 different views of a kinetic energy converter system 10 for powering a refrigeration unit are shown according to an exemplary embodiment of the present invention. A system 10 may include a brake drum subassembly 40. The brake drum subassembly 40 may include a geared brake drum cylinder 12. The geared brake drum cylinder 12 may replace a regular brake drum cylinder of the semi trailer. The brake drum cylinder 12 may be formed by affixing a gear ring 14 to an inner edge of a regular brake drum cylinder, in an alternative implementation of the brake drum cylinder a "lip" may be formed by adding extra material to the inner edge of a regular brake drum cylinder during casting of the brake drum cylinder manufacturing phase. A gear may be cut into the lip to form a geared brake drum cylinder. An electrical power generator subsystem 19 may be coupled to the brake drum cylinder 12 via a pinion gear 16. The electrical power generator subsystem 19 may include a DC generator 20. The DC generator 20 may be coupled to a shaft 18 of the pinion gear 16 through an electric clutch 22 and a shaft coupling 24. Pillow block bearings 26 may be configured to support the shaft 18 of the pinion gear 16 to assure a reliable coupling between the pinion gear 16 and the gear ring 14.

The electrical power generator subsystem 19 may be mounted on a steel mounting plate 28. The steel mounting plate 28 may be attached to an axle 34. Referring now to FIG. 7, a side view of a brake drum assembly of FIG. 4 is shown.

During operation, an electric clutch 22 may be activated. The electric clutch 22 may lock the shaft 18 of the pinion gear 16 and the DC generator 20 together. As best illustrated in FIGS. 6 and 8, clutch 22 has first mating surface 30 and second mating surface 31. Shaft 18 of pinion gear 16 is connected to first mating surface 30 of clutch 22. Second mating surface 31 of clutch 22 is connected to generator 20, thereby, coupling generator 20 to shaft 18. The brake drum cylinder 12, which may rotate with trailer wheels 32, may drive the DC generator 20. Thus the DC generator 20 may convert the kinetic energy into electric power. The produced electrical power may be used to charge batteries and/or may run refrigerator units of the semi-trailer.

The disclosed kinetic energy converter system 10 may also be used on refrigerated train cars.

Figure 9:
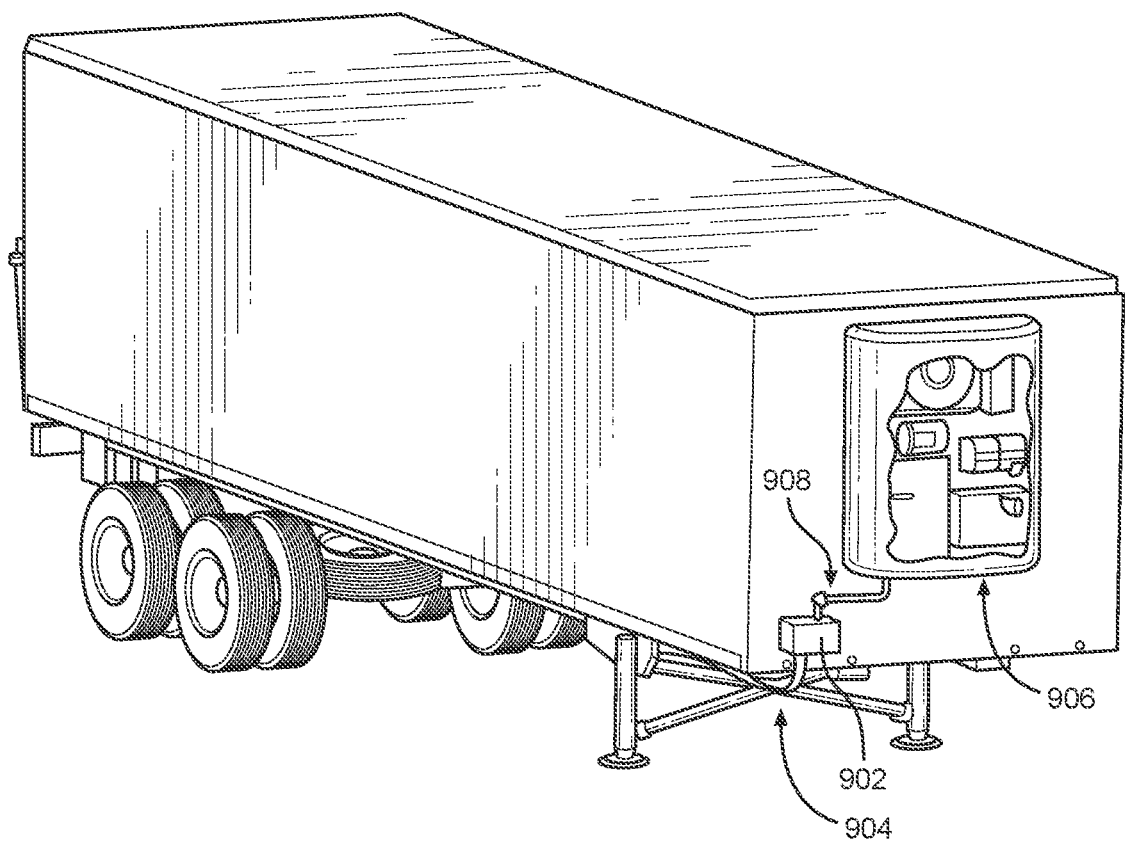
FIG. 9 is a perspective diagram of a refrigerated semi-trailer in accordance with at least one embodiment.

FIG. 9 is a perspective diagram of a refrigerated semi-truck trailer refrigeration system generator in accordance with the present disclosure. In particular, a control module 902 is connected to a generator (not shown) by wiring 904. The control module 902 is also connected to a refrigeration unit 906 via wiring 908.

An embodiment of the present invention generally can provide an electrical power generating system comprising a generator that can be mounted under a vehicle, for example a semi-trailer. The generator can be powered by axle and wheel rotation of the vehicle to provide electrical power to a refrigeration unit.

Figure 10:
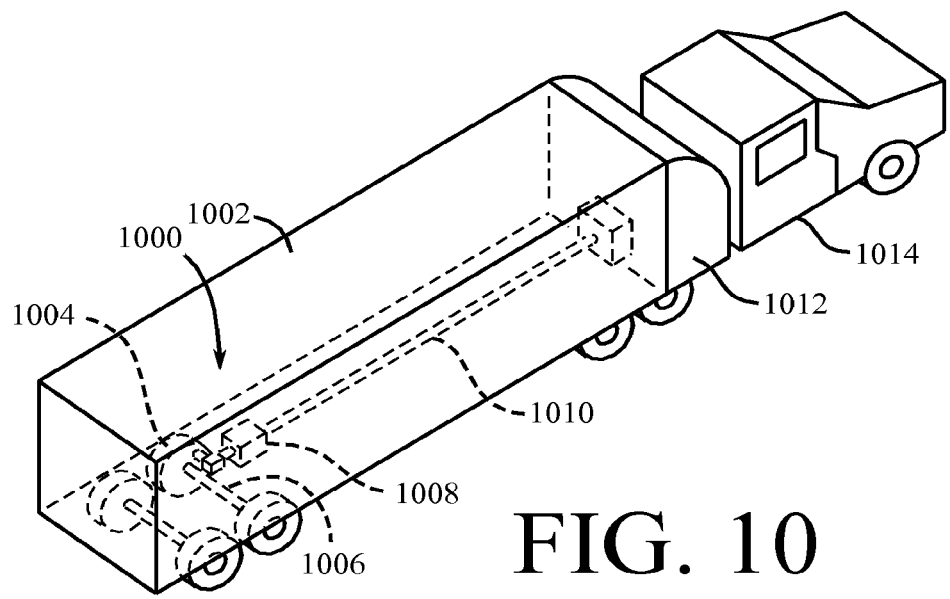
FIG. 10 is a diagram of a refrigerated semi-trailer having an exemplary refrigeration system in accordance with at least one embodiment.
Figure 11:
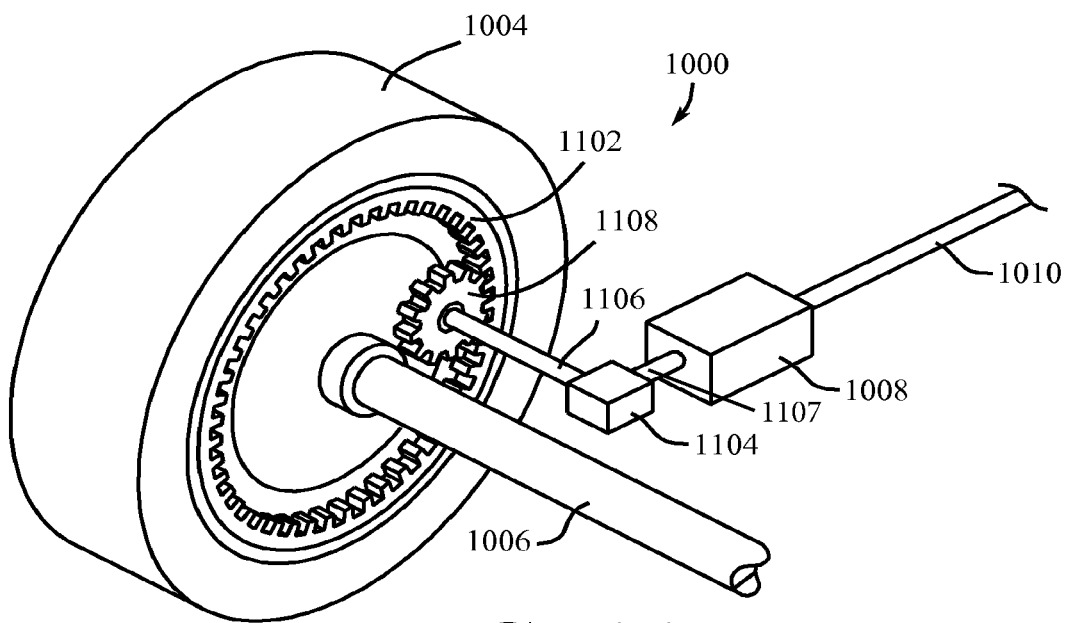
FIG. 11 is a diagram of an exemplary mechanical interface and generator portion in accordance with at least one embodiment.

According to an exemplary embodiment shown in FIGS. 10 and 11, the electrical power generating system comprises a generator 1008, a generator drive shaft 1106, a right angle gearbox/differential joint 1104, a driven gear 1108, a ring gear 1102 installed in the inner rim of a vehicle wheel 1004 and electrical grade shielded conduit wires 1010.

A power generator 1008 equal to the demand of the refrigeration unit 1012 to be powered may be installed under the trailer 1002 of a refrigerated semi-trailer truck (FIG. 10). The generator drive shaft 1106 can be attached at one end through a right angle gearbox/differential joint 1104 at the front of the power generator 1008 and at the other end to a driven gear 1108 which can engage grooves of a ring gear 1102 inside the rim of a selected inner wheel 1004 of the trailer 1002. This driven gear 1108, attached to the generator drive shaft 1106, can spin the internal components of the generator 1008 when it rotates. Therefore, as the vehicle moves and the wheel 1004 rotates, it can turn the driven gear 1108 and the generator drive shaft 1106 and power the generator 1008. The power generator 1008 can thereby produce power (e.g., electrical energy), which can be transferred to the refrigeration unit 1012 by electrical grade shielded conduit wires 1010 that can run under the truck trailer 1002 from the generator 1008 to the refrigeration unit 1012.

To build the system 1000, replace an inner wheel such as the inner wheel of the front set of wheels with a wheel 1004 having a ring gear 1102 that can match the driven gear 1108. The driven gear 1108 can be installed in the wheel 1004 between the ring gear 1102 and the wheel axle 1006. Connect the driven gear 1108 to the generator drive shaft 1106 and connect the generator drive shaft 1106 to the right angle gearbox/differential 1104 in front of the generator 1008 (FIG. 11). Another generator drive shaft 1107 (FIG. 11) has an end in communication with right angle gearbox 1104 located opposite an end in communication with driven gear 1108. FIG. 11 best illustrates right angle gearbox 1104 positioning the first generator drive shaft 1107 at a perpendicular orientation to the second generator drive shaft 1106. The output power cables 1010 can be placed from the generator 1008 to the refrigeration unit 1012 using electrical conduit protected wire.

Refrigerated semi-trailer trucks may rely on diesel power from the engine to power the refrigeration unit 1012, which is located at the front of the semi-trailer 1002 behind the cab 1014 of the truck. An embodiment can reduce or eliminate the dependence on diesel fuel for refrigeration power. The motion of the rear wheels in conjunction with an onboard generator 1008 can supply the power instead.

The system can be designed to fit smaller vehicles such as battery powered cars and trucks, to recharge the vehicles while in motion, eliminating the need to recharge the vehicle while stationary.

An embodiment can be built as part of a new refrigerated vehicle, or provided as a retrofit kit for an existing refrigerated vehicle or cargo conveyance having a different type of refrigeration unit, e.g., a combustion engine refrigeration unit.

FIGS. 12-26 illustrate an alternate embodiment of a novel stand-alone kinetic energy converter system capable of connecting to existing trailers. A set of gears, sprockets, or pulleys are installed on a dedicated tire of the novel stand-alone kinetic energy converter system. At least a portion of the novel stand-alone kinetic energy converter system is retained within a housing or a kit that can be universally mounted to any existing trailer. The novel stand-alone kinetic energy converter system is configured to be rechargeable and is adapted to directly power vehicle components including, but not limited to, a reefer trailer unit, a lift gate, batteries, or any electrical system such as air conditioning and electronics without the use of the onboard battery system of a vehicle. In particular, the novel stand-alone kinetic energy converter system is capable of recharging for example, the onboard batteries of a vehicle without the need to stop at battery charging stations.

The onboard batteries of a vehicle such as, a trailer, can be recharged by the installed novel stand-alone kinetic energy converter system as the trailer is in motion. These onboard batteries can be used as an alternative power source if a trailer breaks down and is no longer in motion to rotate the tire of the novel stand-alone kinetic energy converter system. The novel stand-alone kinetic energy converter system captures kinetic energy from the rotational motion of a tire, such as a pneumatic tire, as the tire is forced to the ground with a biasing dampening structure. The kinetic energy is converted into electrical energy with a generator. It is within the scope of this current invention for a generator to include, but not be limited to, a DC generator, an alternator, or any rotatable device capable of generating electricity or current.

Figure 12:
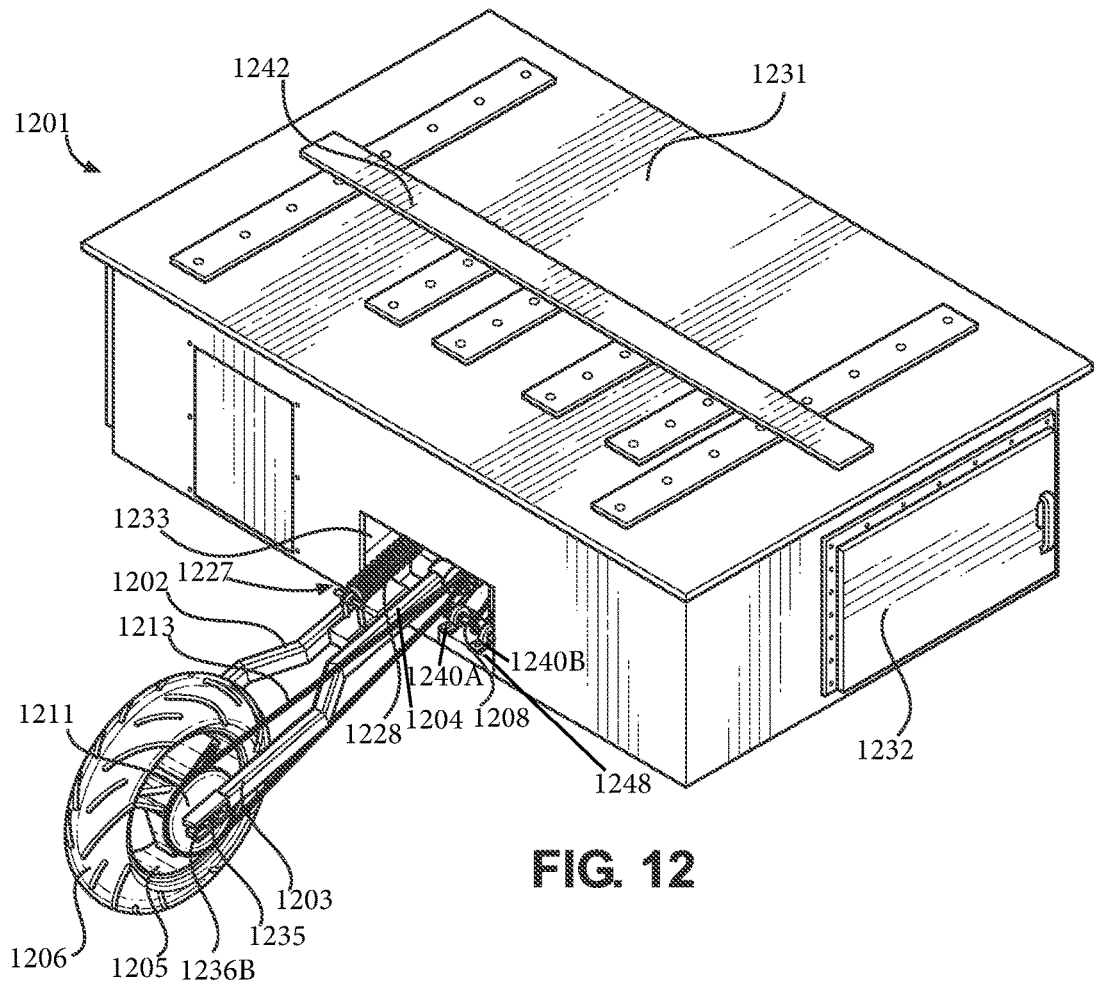
FIG. 12 is a top perspective view of novel stand-alone kinetic energy converter system.
Figure 13A:
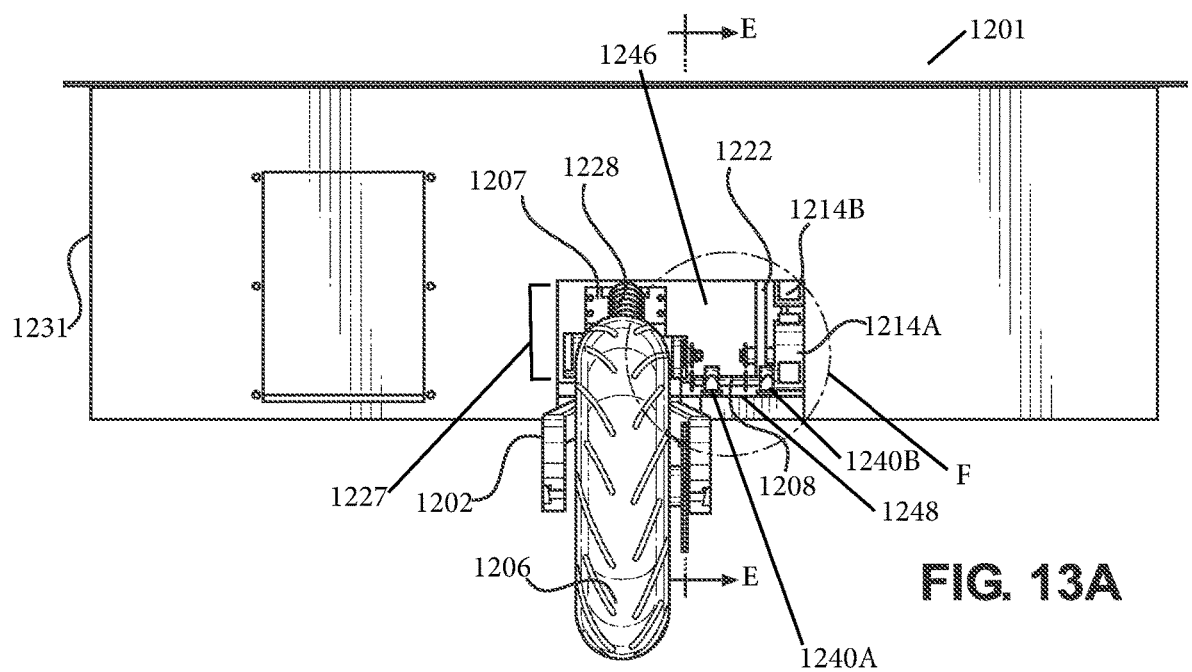
FIG. 13A is a front view of novel stand-alone kinetic energy converter system.
Figure 13B:
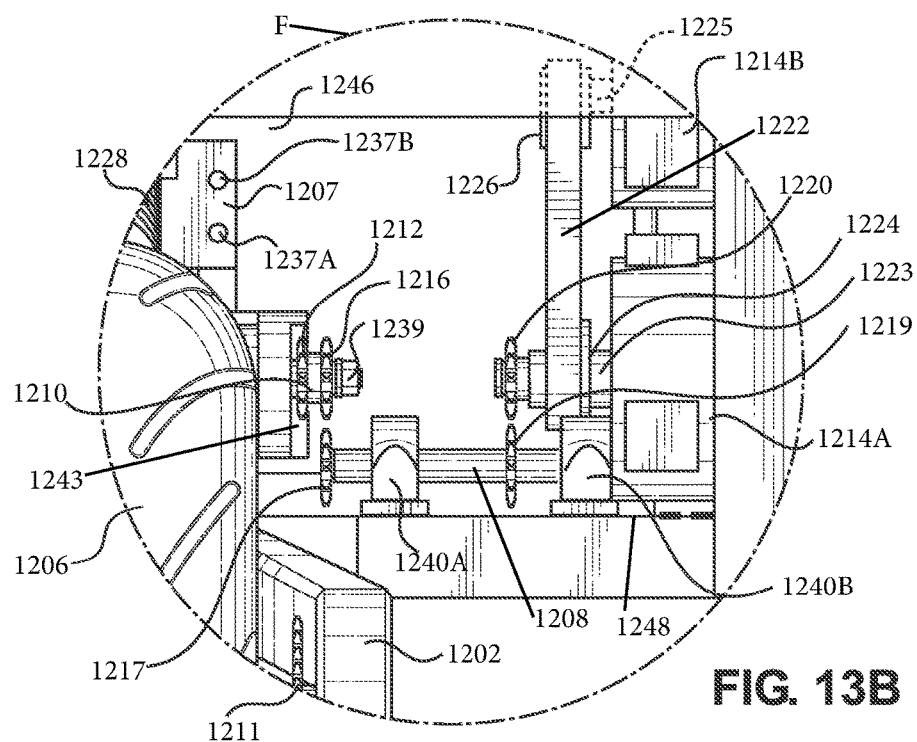
FIG. 13B is a partial view of FIG. 13A at F.
Figure 14:
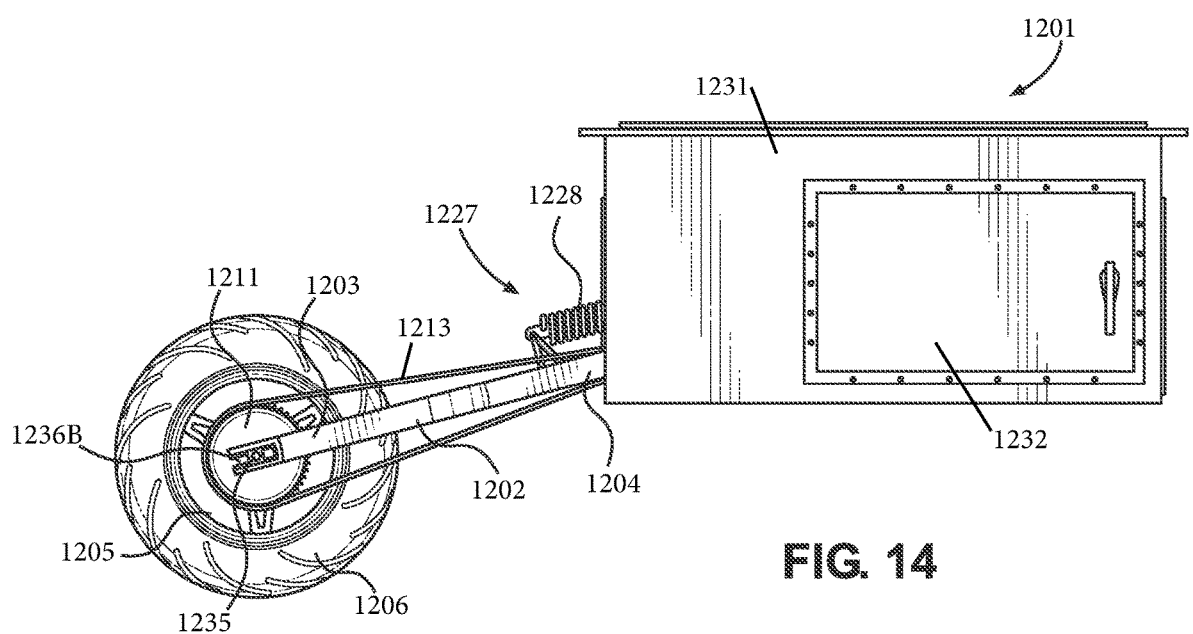
FIG. 14 is a side perspective view of novel stand-alone kinetic energy converter system.
Figure 15A:
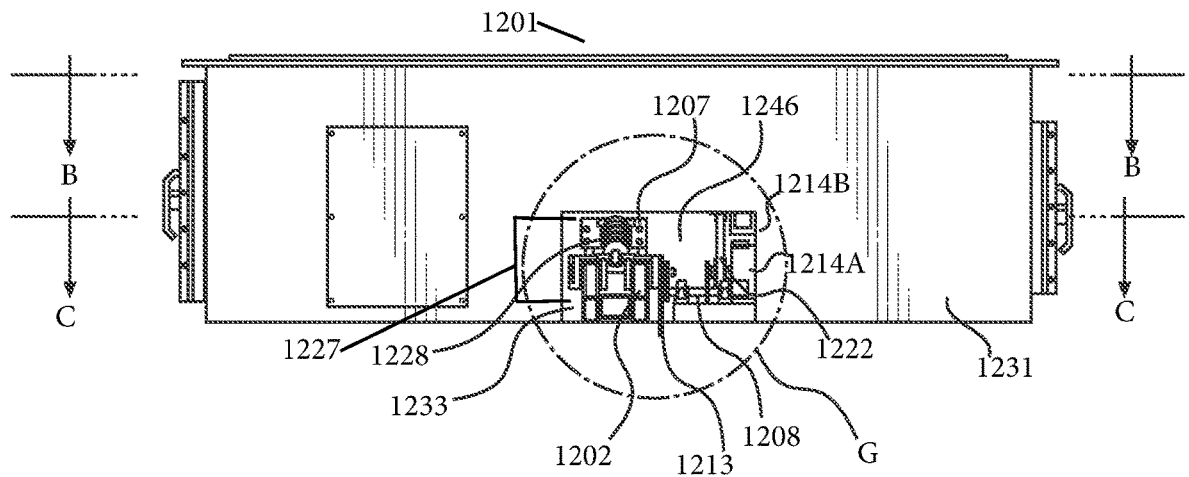
FIG. 15A is a front cross-sectional view of FIG. 13A.

FIGS. 12, 15A, and 14 show novel stand-alone kinetic energy converter system 1201 having housing 1231 having at least one door 1232. FIGS. 12 and 15A further show housing 1231 having opening 1233 for swing arm 1202 to protrude from when mounting structure 1207 (FIGS. 13A, 13B, 15A, 15B, 16A, 18, 20A, 20B, 21, 22, 23A, 23B, 25, and 26) is connected to an inside wall 1246 (FIGS. 13A, 15A, and 15B) of housing 1231. Tire 1206 is configured to contact a driving surface (not shown) including, but not limited to, a road or the ground. Housing 1231 has at least one mounting bracket 1242 (FIG. 12) configured to connect to a trailer or vehicle, whereby, tire 1206 is oriented to contact a driving surface (not shown).

FIG. 12, 13A, 14, 16A, 17 illustrate novel stand-alone kinetic energy converter system 1201 having swing arm 1202. FIGS. 12, 14, 16A, 17, 20A, 20B, 21, 22, and 26 best depict swing arm 1202 having first end 1203 located opposite second end 1204. First end 1203 of swing arm 1202 is rotatably connected to wheel 1205 (FIGS. 12, 14, 20A, and 21). Wheel 1205 is connected to tire 1206 (FIGS. 12, 13A, 14, 16A, 17, 20A, 20B, 21, and 26). It is within the scope of this invention for a tire to include, but not be limited to, a pneumatic tire.

FIGS. 12, 13B, 14, 15B, 18, 20A, 20B, 21, 22, 23A and 26 depict first sprocket 1211. It is within the scope of this invention for any pair of sprockets to be interchangeable with a pair of pulleys. It is also within the scope of the current invention for a sprocket or pulley to include, but not be limited to, a cogged wheel. FIGS. 13B, 15B, 16B, 19, 23A, 23B, and 26 illustrate second sprocket 1212 or pulley.

Wheel 1205 is connected to first sprocket 1211 or pulley. FIG. 26 shows axel 1234 connected to wheel 1205 (FIGS. 12, 14, 20A, 21, 22, and 26). FIGS. 12, 14, 20A, 21, 22, and 26 show tire 1206 being connected to wheel 1205. Axel 1234 receives first sprocket 1211 or pulley. Axel 1234 has at least one threaded end portion 1247 (FIG. 26) that receives fastener 1235 (FIGS. 12, 14, 20A, 20B, 21, 22, and 26) to secure first sprocket 1211 or pulley to axel 1234. First sprocket 1211 or pulley of wheel 1205 is configured to drive second sprocket 1212 or pulley by first chain 1213 or a belt. It is within the scope of this invention for first chain or belt 1213 (FIGS. 12, 14, 15A, 15B, 16A, 16B, 17, 20B, and 26) to include, but not be limited to, a link chain or belt. The link chain can operate with a set of sprockets and a belt can operate with a set of pulleys.

Figure 16A:
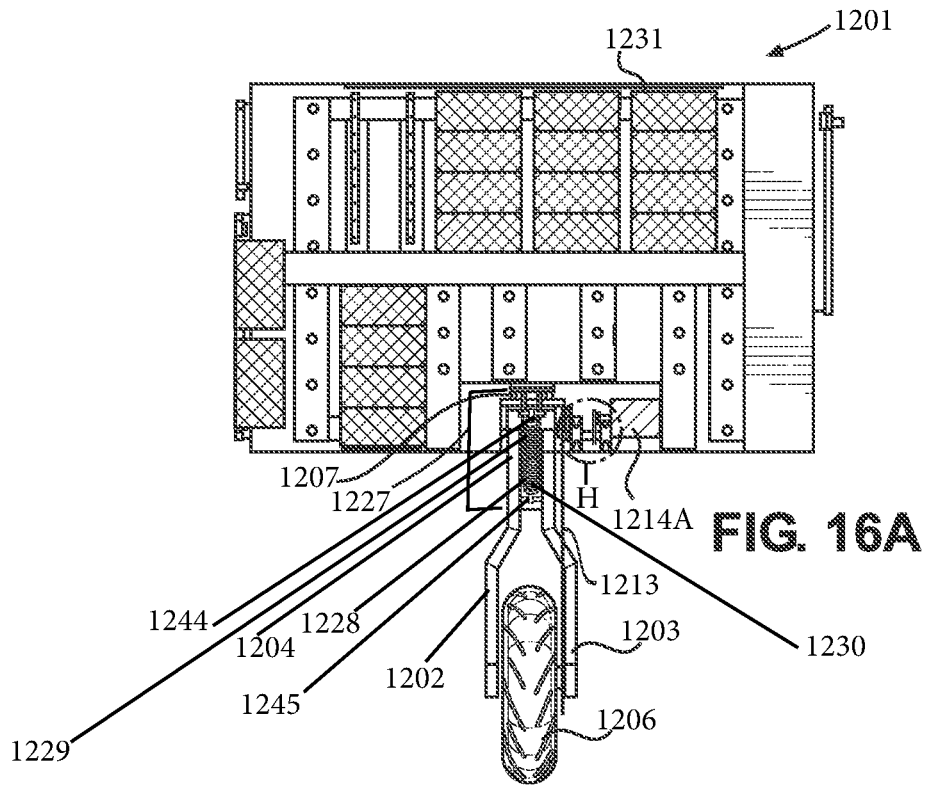
FIG. 16A is a top cross-sectional view of FIG. 15A along C-C.
Figure 17:
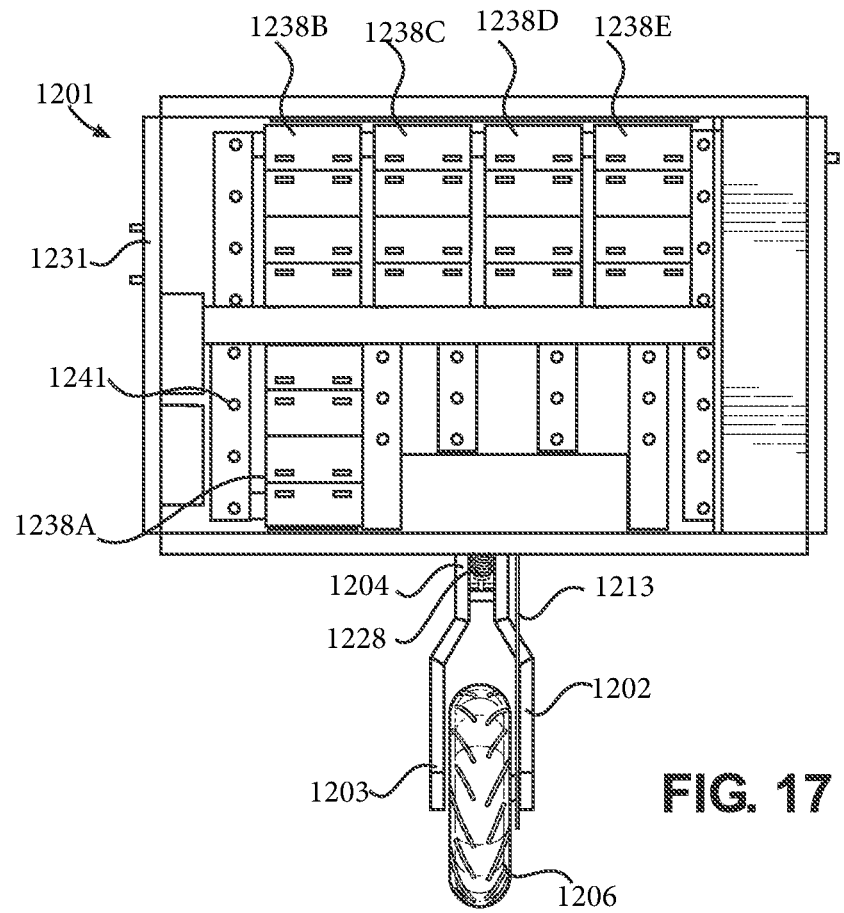
FIG. 17 is a top cross-sectional view of FIG. 15A along B-B.
Figure 18:
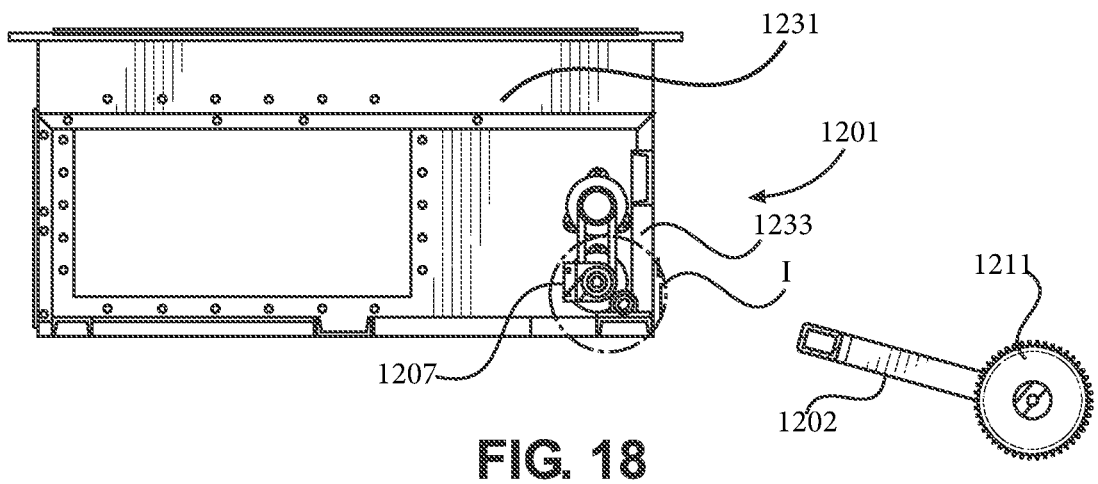
FIG. 18 is a side cross-sectional exploded view of FIG. 15A along E-E.
Figure 19:
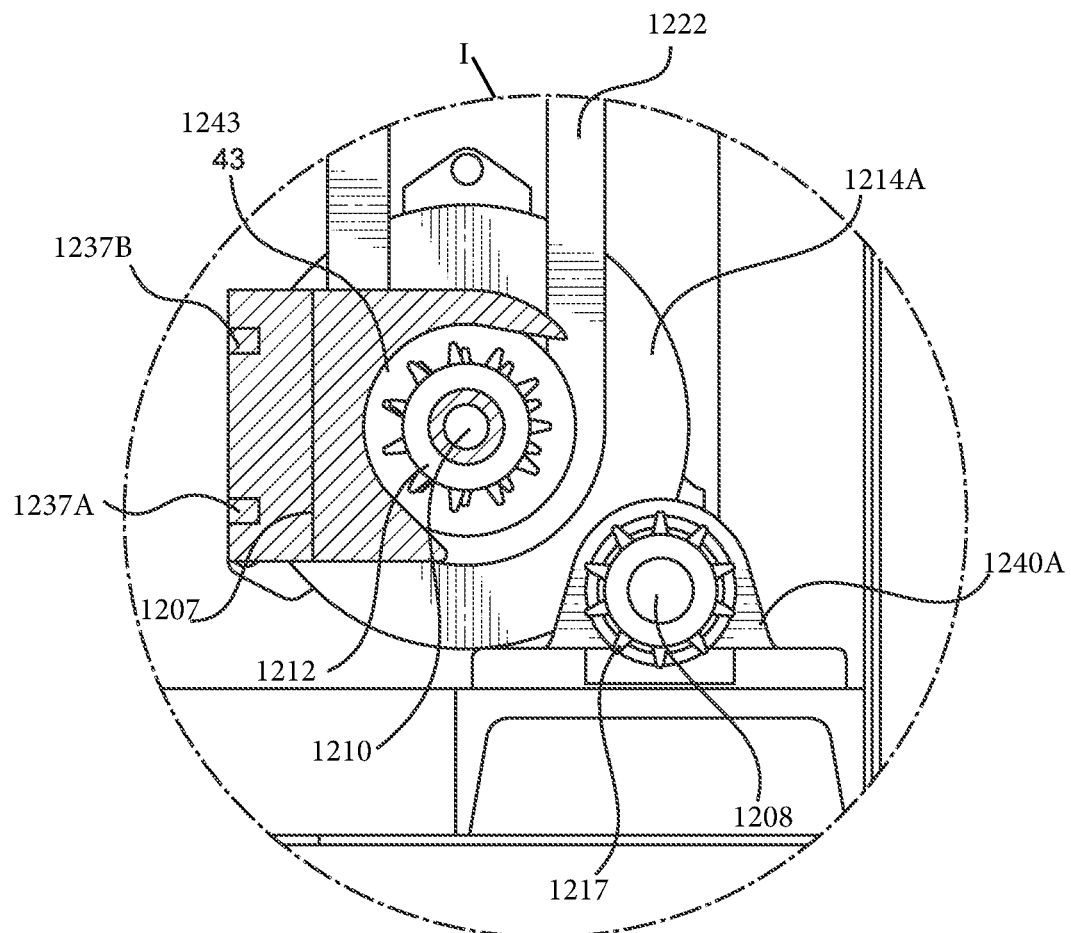
FIG. 19 is a partial view of FIG. 18 at I.

FIGS. 16A and 17 illustrate novel stand-alone kinetic energy converter system 1201 having housing 1231. FIG. 17 best depicts housing 1231 retaining at least one battery 1238A, 1238B, 1238C, 1238D, and 1238E. Housing 1231 can have at least one bracket 1241 (FIG. 17). Biasing element 1228 forces tire 1206 against a driving surface (not shown). It is within the scope of this invention for stand-alone kinetic energy converter system 1201 to have at least one battery receiving power from at least one generator.

FIG. 20B depicts pillow block bearings 1240A (FIGS. 12, 13A, 13B, 16B, 19 and 20B) and 1240B (FIGS. 12, 13A, 13B, 16B, 19, and 20B) connected to second rotatable shaft 1208. Pillow block bearings 1240A and 1240B are connected to an inner wall surface 1248 of housing 1231 as best illustrated in FIGS. 12, 13A, 13B, and 15B.

Figure 22:
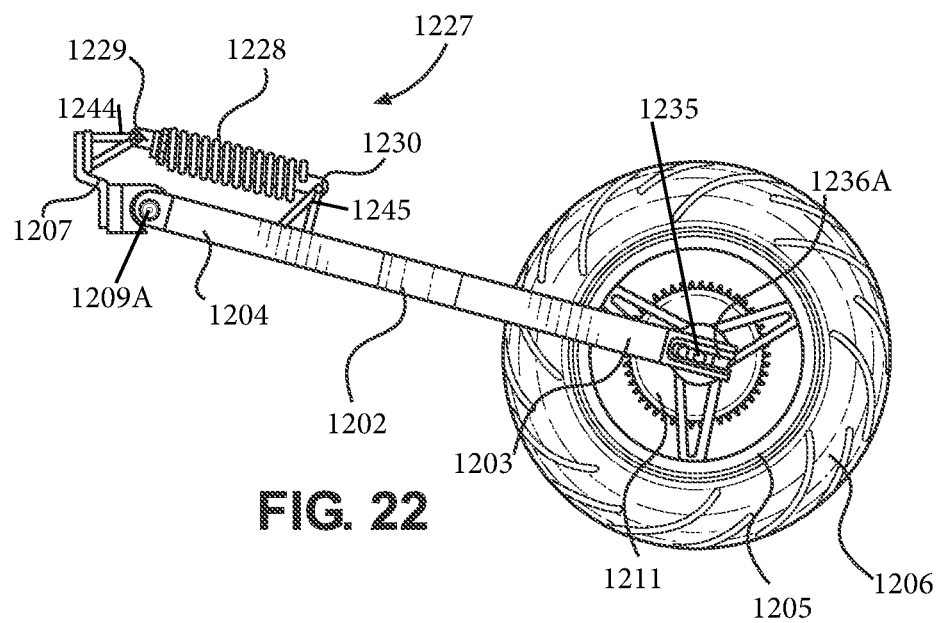
FIG. 22 is a side view of a swing arm connected to a tire and a mounting structure.
Figure 23A:
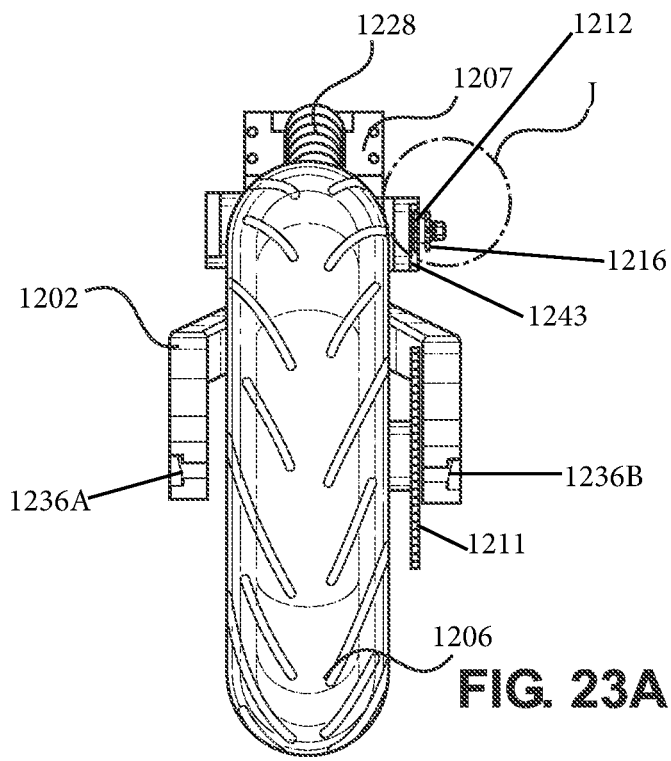
FIG. 23A is a front view of a swing arm connected to a tire and a mounting structure.

FIGS. 22 and 23A illustrate swing arm 1202 connected to tire 1206 and mounting structure 1207. Biasing element 1228 is connected to mounting structure 1207 and swing arm 1202. Swing arm 1202 has slot 1236A and 1236B (FIG. 23A) receiving at least a portion of axel 1234 and retaining fastener 1235 of axel 1234 (FIG. 26). First sprocket 1211 is aligned with second sprocket 1212 (FIG. 23A) or pulley. Second sprocket 1212 is set back within mounting structure recess 1243. Second sprocket 1212 is oriented parallel to third sprocket 1216 or pulley (FIG. 23A).

FIG. 23B best illustrates mounting structure 1207 connected to first rotatable shaft 1210. First rotatable shaft 1210 has second sprocket 1212 or pulley and third sprocket 1216 or pulley connected thereto. Second sprocket 1212 or pulley is retained within mounting structure recess 1243. Fastener 1239 (FIGS. 16B, 23B and 26) is connected to at least one end of rotatable shaft 1210 to secure rotatable shaft 1210 with second sprocket 1212 or pulley and third sprocket 1216 or pulley to mounting structure 1207 and swing arm 1202. Second sprocket 1212 is set back within mounting structure recess 1243.

FIG. 24 illustrates swing arm 1202 having first end 1203 located opposite second end 1204. Second end 1204 of swing arm 1202 has pivot point 1209A (FIG. 26) and 1209B (FIGS. 24 and 26). First end 1203 of swing arm 1202 has slot 1236A (FIGS. 22, 26) and 1236B (FIGS. 12, 14, 20A, 20B, 21, 24, and 26).

Figure 20A:
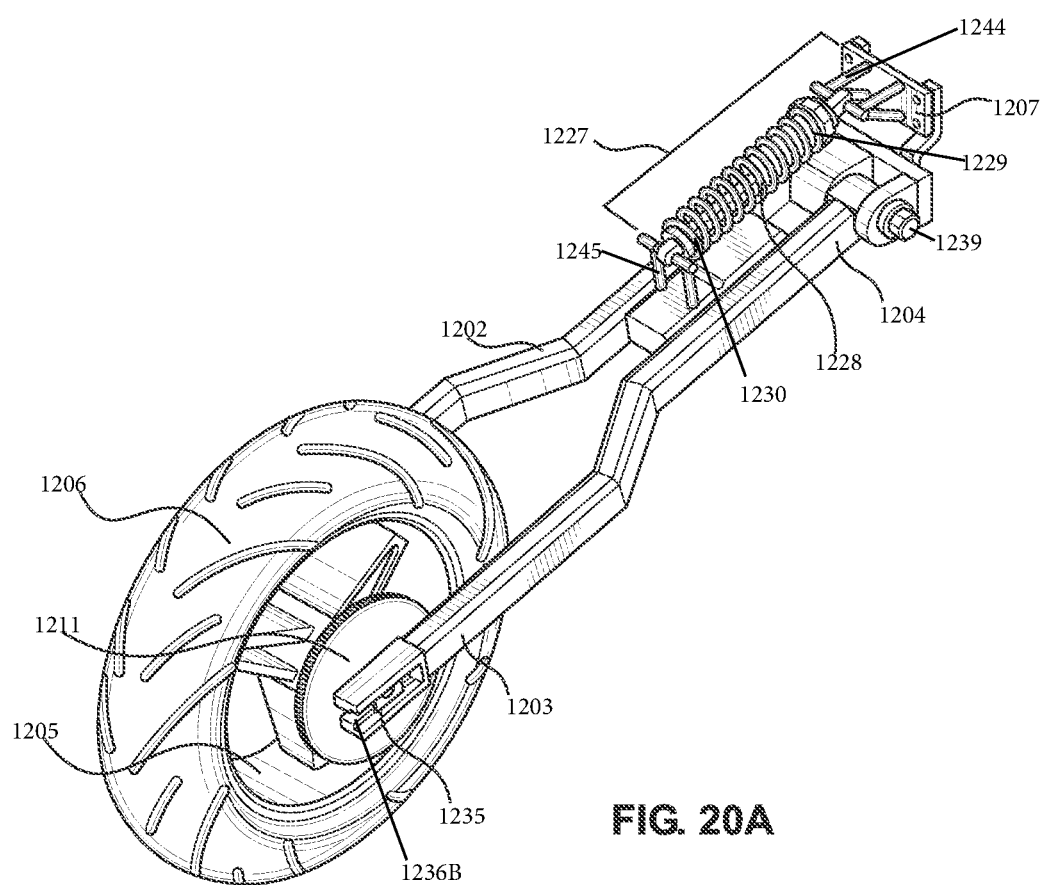
FIG. 20A is a perspective view of a swing arm connected to a tire and a mounting structure.

FIG. 25 depicts mounting structure 1207 having at least one mounting structure recess 1243 (FIGS. 23B, 25, and 26) capable of retaining or housing second sprocket 1212 or pulley. Although mounting structure 1207 having at least one mounting recess 1243 is a preferred embodiment of this invention, FIGS. 20A and 20B illustrate an alternate embodiment of mounting structure 1207 not having mounting structure recess 1243. Mounting structure 1207 has dampener mount 1244. FIGS. 20B and 26 show mounting structure 1207 having openings 1237A, 1237B, 1237C, and 1237D (FIG. 26) configured to receive fasteners 1218 (FIG. 26) to anchor mounting structure 1207 to inside wall 1246 (FIGS. 13A, 13B, 15A, and 15B) of housing 1231.

As best illustrated in FIG. 26, second end 1204 of swing arm 1202 has pivot point 1209A and 1209B (FIGS. 24 and 26). Second end 1204 of swing arm 1202 has first rotatable shaft 1210. First rotatable shaft 1210 is rotatably mounted within pivot point 1209A and 1209B of swing arm 1202 when pivot points of second end 1204 of swing arm 1202 are aligned with openings 1249A, 1249B, and 1249C of mounting structure 1207. First rotatable shaft 1210 connects mounting structure 1207 (FIGS. 13A, 13B, 15A, 15B, 16A, 18, 19, 20A, 20B, 21, 22, 23A, 23B, 25, and 26) to swing arm 1202. First rotatable shaft 1210 is connected to second sprocket 1211 or pulley and said third sprocket 1216 (FIGS. 13B, 15B, 16B, 21, 23B, 26) or pulley. First end 1203 of swing arm 1202 has slot 1236A and 1236B receiving at least a portion of axel 1234.

Second rotatable shaft 1208 (FIGS. 12, 13A, 13B, 15A, 15B, 16B, 19, 20B) retains fourth sprocket 1217 or pulley (FIGS. 13B, 15B, 16B, 20B) and fifth sprocket 1219 or pulley (FIGS. 13B, 15B, 16B, 20B) in a parallel orientation. As best illustrated in FIGS. 13B, 15B and 16B, third sprocket 1216 or pulley of first rotatable shaft 1210 is configured to drive fourth sprocket 1217 or pulley of second rotatable shaft 1208 by second chain 1215 or belt (FIGS. 15B, 16B, and 20B).

Figure 15B:
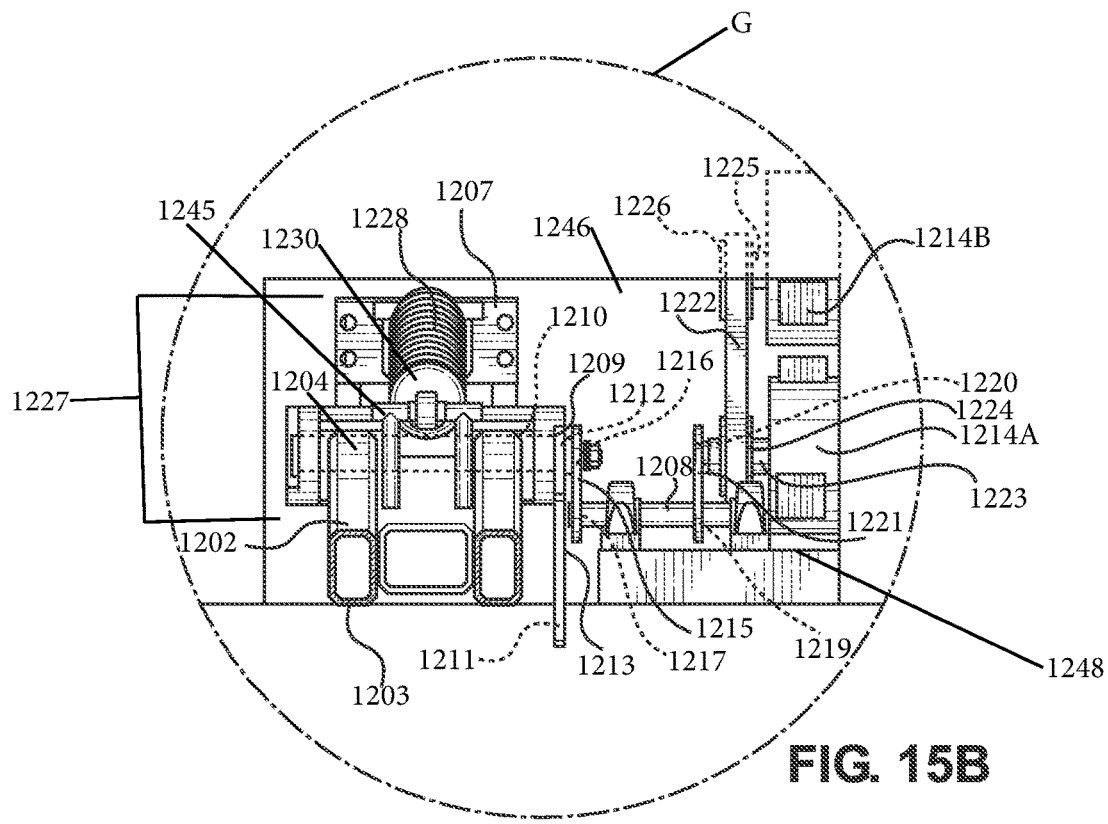
FIG. 15B is a partial view of FIG. 15A at G.
Figure 16B:
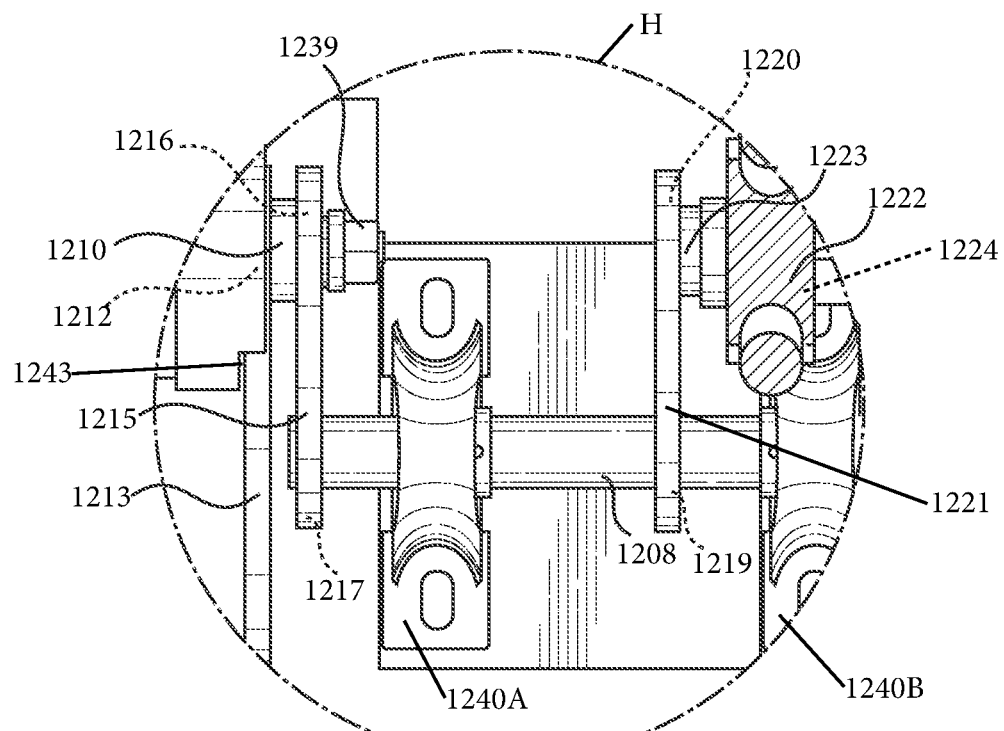
FIG. 16B is a partial view of FIG. 16A at H.

FIGS. 13A, 13B, 15A, 15B, 16A, 20B illustrate first generator 1214A having third rotatable shaft 1223 (FIGS. 13B, 15B, and 16B). Third rotatable shaft 1223 of first generator 1214A is connected to sixth sprocket 1220 or pulley (FIGS. 13B, 15B, and 16B). Fifth sprocket 1219 or pulley of second rotatable shaft 1208 is configured to drive sixth sprocket 1220 or pulley of first generator 1214A by third chain 1221 or belt (FIGS. 15B, 16B, and 20B). Fifth sprocket 1219 or pulley is aligned with sixth sprocket 1220 or pulley.

Stand-alone kinetic energy converter system 1201 can have second generator 1214B (FIGS. 13A, 13B, 15A, 15B, and 20B). FIGS. 13B and 15B best illustrate second generator 1214B having fourth rotatable shaft 1225 having eighth sprocket or pulley 1226. Third rotatable shaft 1223 of first generator 1214A is connected to seventh sprocket or pulley 1224. Seventh sprocket or pulley 1224 of first generator 1214A is configured to drive eighth sprocket or pulley 1226 of second generator 1214B by fourth chain or belt 1222. Sixth sprocket 1220 or pulley and seventh sprocket or pulley 1224 are both located on third rotatable shaft of first generator 1214A and are oriented in a parallel orientation. Seventh sprocket or pulley is aligned with eighth sprocket or pulley 1226.

Stand-alone kinetic energy converter system 1201 has dampening assembly 1227. FIGS. 12, 14, 15A, 15B, 16A, 20A, 20B, 21, 22 best illustrate dampening assembly 1227 having biasing element 1228. Biasing element 1228 has first end 1229 located opposite second end 1230. FIGS. 16A, 20A, 20B, 21, and 22 best depict first end 1229 of biasing element 1228 is connected to dampener mount 1244 of mounting structure 1207. FIGS. 15B and 22 best show second end 1230 of biasing element 1228 is connected to dampener mount 1245 of swing arm 1202. Tire 1206 of swing arm 1202 is substantially biased to the road or driving surface (not shown). It is within the scope of this invention for biasing element 1228 to be a coil over shock absorber. A spring leaded dampener can be a coil over shock absorber. It is also within the scope of this current invention for dampening assembly 1227 to be a gas charged strut having a dampener.

It is within the scope of this invention for biasing element 1228 to include, but not be limited to, a spring, a resilient member, or airbag such as a conventional automotive air shock absorber.

It is within the scope of this invention for slot 1236A and 1236B of swing arm 1202 to be capable of moving wheel 1205 and first sprocket or pulley 1211 closer to or further away from second sprocket or pulley 1212 to adjust the tension of first chain or belt 1213.

In a preferred embodiment, housing 1231 retains at least one battery 1238, an inverter, and direct current and/or alternating current controls. In an alternate embodiment, at least one battery is mounted remotely away from housing 1231. For example, the battery is not connected to housing 1231.

In an alternate embodiment, the novel stand-alone kinetic energy converter system is capable of being remotely monitored. A cellular interface is provided for a user to monitor battery usage and charge levels.

In a preferred embodiment, it is envisioned the novel stand-alone kinetic energy converter system to be capable of charging the batteries starting at a speed from approximately 15 miles per hour. This may be accomplished by incorporating a hydro/electrical-mechanical clutch installed as a component of the rotating assembly of the novel stand-alone kinetic energy converter system. The hydro/electrical-mechanical clutch is in communication with or connected to programmable logic controller/controls/programming to send and receive data. The programmable logic controller facilitates clutch slippage and prevents output from the direct current charging system exceeding pre-determined levels.

It will be appreciated that the figures and examples described above are for purposes of illustrating and explaining principles, features and exemplary embodiments of the present invention and are not intended to be limiting. In particular, other mechanical and electrical connections between the different components and configurations of components could be used. Also, any dimensions shown are exemplary for illustration purposes.

In addition to being configured as a system to power a refrigeration unit solely from electrical power, an embodiment can be configured as a hybrid system in which a combustion engine is supplemented by an electrical generation system as described herein. Such a hybrid system may use the combustion engine to generate electrical energy when the vehicle is not in motion, or may use the combustion engine to power the refrigeration unit when the electrical motor is not powering the refrigeration unit.

While embodiments have been described in terms of semi-trailers and railroad cars, it will be appreciated that an embodiment can be used with any refrigerated vehicle or cargo conveyance in which mechanical energy is available to power an electrical generator. Refrigerated vehicles or cargo conveyances can include, but not be limited to, cargo ships, aircraft, watercraft, cars, trucks, vans, or the like.

Also, it will be appreciated that, while the examples discussed above are in terms of refrigeration, the same principles would apply to a system for vehicles or cargo conveyances in which other environmental factors need to be maintained, such as heat, ventilation, humidity, pressure or the like.

Further, while the above examples have been described in terms of cargo conveyances, an embodiment can be used to power heating, cooling, ventilation or other environmental systems for passenger vehicles and conveyances.

It will be appreciated that the control modules, processes, systems, and sections described above can be implemented in hardware, hardware programmed by software, software instructions stored on a nontransitory computer readable medium or a combination of the above. A system for controlling the power generation, distribution and operation of a refrigeration unit, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a nontransitory computer-readable medium such as a computer memory or storage device which may be any suitable memory apparatus, including, but not limited to, ROM, PROM, EEPROM, RAM, flash memory, magnetic disk drives, optical disk drives and the like.

Furthermore, the modules, processes systems, and sections can be implemented as a single processor or as a distributed processor. Further, it should be appreciated that the steps mentioned above may be performed on a single or distributed processor (single and/or multi-core). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The control modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the control method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed control method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the database and/or computer programming arts.

Moreover, embodiments of the disclosed control method, system, and computer program product can be implemented in software executed on a programmed general purpose computer, a special purpose computer, a microprocessor, or the like.

It is, therefore, apparent that there is provided, in accordance with the various embodiments disclosed herein, a refrigeration system.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

The invention claimed is:

1. A stand-alone kinetic energy converter system, comprising:
   a swing arm having a first end located opposite a second end;
   a wheel, said wheel comprising a tire;
   said first end of said swing arm rotatably connected to said wheel;
   a first sprocket or pulley;
   a second sprocket or pulley;
   a third sprocket or pulley;
   a mounting structure;
   said second end of said swing arm having a pivot point, said second end of said swing arm having a first rotatable shaft, said first rotatable shaft rotatably mounted within said pivot point, said first rotatable shaft connecting said mounting structure to said swing arm, said first rotatable shaft connected to said second sprocket or pulley and said third sprocket or pulley;
   said wheel connected to said first sprocket or pulley, said first sprocket or pulley of said wheel is configured to drive said second sprocket or pulley by a first chain or a belt;
   a second rotatable shaft comprising a fourth sprocket or pulley and a fifth sprocket or pulley, said third sprocket or pulley of said first rotatable shaft is configured to drive said fourth sprocket or pulley of said second rotatable shaft by a second chain or a belt; and,
   a first generator, said first generator comprising a third rotatable shaft, said third rotatable shaft of said first generator connected to a sixth sprocket or pulley, said fifth sprocket or pulley of said second rotatable shaft is configured to drive said sixth sprocket or pulley of said first generator by a third chain or a belt.

2. The stand-alone kinetic energy converter system of claim 1, further comprising:
   a second generator, said second generator having a fourth rotatable shaft, said fourth rotatable shaft comprising an eighth sprocket or pulley, said third rotatable shaft of said first generator connected to a seventh sprocket or pulley, said seventh sprocket or pulley of said first generator is configured to drive said eighth sprocket or pulley of said second generator by a fourth chain or a belt.

3. The stand-alone kinetic energy converter system of claim 1, further comprising:
   a dampening assembly comprising a biasing element, said biasing element having a first end located opposite a second end, said first end of said biasing element connected to said mounting structure, said second end of said biasing element connected to said swing arm, whereby, said tire of said swing arm is substantially biased to the road.

4. The stand-alone kinetic energy converter system of claim 3, further comprising:
   said biasing element is a coil over shock absorber.

5. The stand-alone kinetic energy converter system of claim 1, further comprising:
   at least one battery, said at least one battery receiving power from at least one generator.

6. The stand-alone kinetic energy converter system of claim 1, further comprising:
   at least a portion of said swing arm retained within a housing, whereby, a tire of said swing arm is substantially biased to the road.

7. The stand-alone kinetic energy converter system of claim 6, further comprising:
   said housing retaining at least one battery, said at least one battery receiving power from at least one generator.

8. The stand-alone kinetic energy converter system of claim 6, further comprising:
   at least one battery is mounted remotely from said housing.

9. The stand-alone kinetic energy converter system of claim 1, further comprising:
   said mounting structure having at least one mounting structure recess configured to retain said second sprocket or pulley.

* * * * *